(12) United States Patent
Deindl et al.

(10) Patent No.: US 6,173,401 B1
(45) Date of Patent: Jan. 9, 2001

(54) IMPORTING INFORMATION ONTO A CHIP CARD

(75) Inventors: Michael Deindl, Böblingen; Walter Hänel, Holzgerlingen; Albert Schaal, Tübingen, all of (DE)

(73) Assignee: International Business Machine Corp., Armonk, NY (US)

( * ) Notice: Under 35 U.S.C. 154(b), the term of this patent shall be extended for 0 days.

(21) Appl. No.: 09/059,841

(22) Filed: Apr. 14, 1998

(30) Foreign Application Priority Data

Apr. 17, 1997 (DE) .............................................. 197 16 015

(51) Int. Cl.⁷ .............................. H04L 9/00; G06F 11/30; G06F 17/60
(52) U.S. Cl. .............................. 713/176; 713/187; 705/67
(58) Field of Search .................................... 713/187, 191, 713/192, 176; 235/382.5; 705/65–67

(56) References Cited

U.S. PATENT DOCUMENTS

| | | | |
|---|---|---|---|
| 4,827,512 | * 5/1989 | Hirokawa et al. | 713/191 |
| 4,930,129 | 5/1990 | Takahira | 371/40.4 |
| 5,191,608 | 3/1993 | Geronimi | 380/4 |
| 5,473,690 | * 12/1995 | Grimonprez et al. | 705/66 |
| 5,544,246 | * 8/1996 | Mandelbaum et al. | 705/65 |
| 5,778,070 | * 7/1998 | Mattison | 713/191 |
| 5,923,884 | * 7/1999 | Peyret et al. | 395/712 |
| 5,970,145 | * 10/1999 | McManis | 713/187 |

FOREIGN PATENT DOCUMENTS

| | | | |
|---|---|---|---|
| 0559170 | 9/1993 | (EP) | G06K/19/06 |
| 2314948 | 1/1998 | (GB) | G06F/12/14 |

\* cited by examiner

Primary Examiner—Pinchus M. Laufer
Assistant Examiner—Bryan Latham
(74) Attorney, Agent, or Firm—Karl O. Hesse

(57) ABSTRACT

The invention relates to a method of importing information, in particular application information, onto a chip card which has a memory with a directory. The information being transferred onto the chip card comprises data and code, and it is often necessary to distribute these data and the code to different files in the directory. The method of the invention establishes whether the data and the code have been placed properly in the various files. The invention makes it possible to verify whether the information has been placed in the proper location allocated to it in the memory of the chip card. When an application is to be placed onto a chip card, the information is loaded into the chip card memory but is no allowed to be used until its location on the card is verified. Verification is accomplished by calculating an electronic fingerprint of the information and it's location. The fingerprint is compared with at least one other electronic fingerprint, and the stored information is activated only if on comparison a match is established between the electronic fingerprint and at least one other electronic fingerprint.

2 Claims, 2 Drawing Sheets

IMPORTING INFORMATION ONTO A CHIP CARD

BACKGROUND OF THE INVENTION

1. Field of the Invention

The invention relates to the importing of information, especially application information, onto a chip card, which has a memory with a directory.

2. Description of Related Art

Since the mid-1980s, chip cards have been used in an increasing number of spheres of daily life. The success of chip cards is based essentially on their high manipulation security and reliability. Furthermore, great flexibility for a large number of chip card applications is guaranteed by the programmability of the chips on the chip card. Chip cards are discussed generally in Smart Cards by Jerome Svigals (MacMillan Pub. Co., 1985), which is specifically incorporated by reference herein.

The manufacture of a chip card up to the point at which it can be issued to a user is described in RankliEffing: Handbuch der Chipkarten, Karl Hanser Verlag, 1996, which is specifically incorporated by reference herein. After a module with the semiconductor chip has been embedded into the chip card, global data and personal data of the future card user is then imported onto the chip card. In this regard the issuer of the chip card is increasingly importing several applications simultaneously onto the chip card.

The internal structure of the chip card basically conforms to the ISO 7816/4 standard, which is specifically incorporated by reference herein. The data and/or the code belonging to an application are normally deposited in files. The files are located in a directory in the chip card memory. The files and the directory are imported by the card issuer onto the chip card. If a new application is to be placed by an application supplier on a chip card which has already been issued, particular attention should be paid to the chip card security system. This is especially true if applications which are not under the control of the card issuer are involved. If an application supplier places data and/or code independently on the chip card, the danger exists that the data and/or code deposited will undermine the security of the chip card. This may be the intention if it is insinuated that the application supplier has an interest in spying out applications of the card issuer or other application suppliers. However, unintentional impairment of the security system of the chip card may also be caused in particular by the erroneous placing of new applications.

A method is known from DE 38 07 997 of placing data on a chip card. The chip card has a memory, which is divided into several sub-areas. One of these sub-areas is formed as a protected sub-area, in which address information and error-checking codes for other sub-areas are stored. The protected sub-area is protected by programming the microprocessor of the chip card in such a way that it prevents access of a terminal to the protected sub-area. Information which is disposed in the protected sub-area can hereby be protected against the access of an unauthorized application supplier.

The German patent application with the file reference 196 26 339 discloses a method of loading applications and data securely onto chip cards. In this method, an identification character is allocated. The identification character is ascertained before execution of a command, by means of which the data are to be imported into a sub-area of the chip card. In ascertaining the identification character, it is established whether execution of the command in the sub-area is permitted. Execution of the command is prevented if it is established when ascertaining the identification character that execution of the command is not permitted in the sub-area. The execution of certain commands, in particular commands for importing applications onto the chip card, can hereby be limited to certain sub-areas.

In the case of a further known method for importing application information onto a chip card, the information is provided with an electronic signature. The electronic signature is calculated in this process by means of a cryptographic key from an electronic fingerprint of the information. The information and the electronic signature are transferred to the chip card. On the chip card, another electronic signature of the information transferred to the chip card is calculated with the aid of a further cryptographic key. It can then be verified hereby whether the electronic signature transferred to the chip card and the electronic signature calculated on the chip card match. If this is the case, the information has been transferred without error to the chip card. Manipulation is prevented in this known method by the fact that the further cryptographic key is certified by a trustworthy authority.

It is not possible with the aid of the known method described in the last section to verify whether the information has been placed in the location allocated to it in the memory of the chip card. If an application which is to be placed onto the chip card comprises data and code, it may be necessary to distribute these data and the code to different files in the directory. Using the known method, it can then be verified whether the data and the code have been transferred without manipulation of the same to the chip card. However, it is not possible to establish by means of the known method whether the data and the code have been placed properly in the various files.

SUMMARY OF THE INVENTION

It is the object of the present invention to create an improved possibility of importing information onto a chip card.

This object is achieved according to the independent claims 1 and 10.

The basic advantage achieved by the invention compared with the state of the art consists in the fact that in addition to checking that the information has been transferred without error to the chip card, it is also checked that the information has been integrated into the chip card according to additional information. only if the additional information has been properly heeded when changing the contents of the memory can the information imported be used to execute an application.

The importing of information into an area of the chip card memory which is not permitted for this is thus prevented. This increases the security standard of the chip card.

In a suitable embodiment of the invention, at least one further electronic fingerprint is stored on the chip card. The electronic fingerprint which is used to verify the information transferred to the chip card can hereby be disposed on the chip card at any time in order to be used later when information is imported. Several electronic fingerprints can be disposed on the chip card at one time, the information belonging to each fingerprint being imported onto the chip card at different times.

Provision can be made advantageously for at least one further electronic fingerprint to be ascertained by means of a cryptographic key from an electronic signature. This permits the inclusion of a further security measure, encoding and decoding, when importing the information, due to which the security standard is further improved.

In a suitable development of the invention, data and/or a code are disposed in a file in the memory directory when changing the contents of the memory, the additional information comprising a path indication for the file. The arrangement of data and/or code in a particular file of the memory is hereby guaranteed by means of the additional information.

An advantageous configuration of the invention provides for the file to be generated before the data and/or code are disposed in the same, due to which the file required for importing the information is generated directly in connection with the importing, and a step for the advance creation of files for importing information is saved.

Provision can be made advantageously for the directory to be created prior to the disposal of data and/or the code in the file, due to which the creation of additional directories in the memory of the chip card is facilitated on importing the information.

The additional information can expediently comprise information regarding a specification of the file, in particular regarding an identification and size of the file. It is hereby guaranteed that the data and/or the code can only be disposed in files which have features such as are required for using the data and/or the code in the context of an application of the chip card.

In an advantageous development of the invention, the additional information comprises information regarding the directory, by means of which it is verified whether the directory has the attributes necessary for using the data and/or the code. These attributes include in particular a suitable file structure of the directory.

An advantageous configuration of the invention provides for the additional information to comprise information regarding further files in the directory. It is hereby verified whether further files in the directory, into which the data and/or the code are imported, have the features required for using the data and/or the code.

With regard to the suitable embodiments of the invention as a chip card in claims 10 to 16, the advantages stated in connection with the relevant method claims apply accordingly.

BRIEF DESCRIPTION OF THE DRAWINGS

The invention is subsequently described in more detail in connection with the drawing, in which.

DETAILED DESCRIPTION

Figure 1:
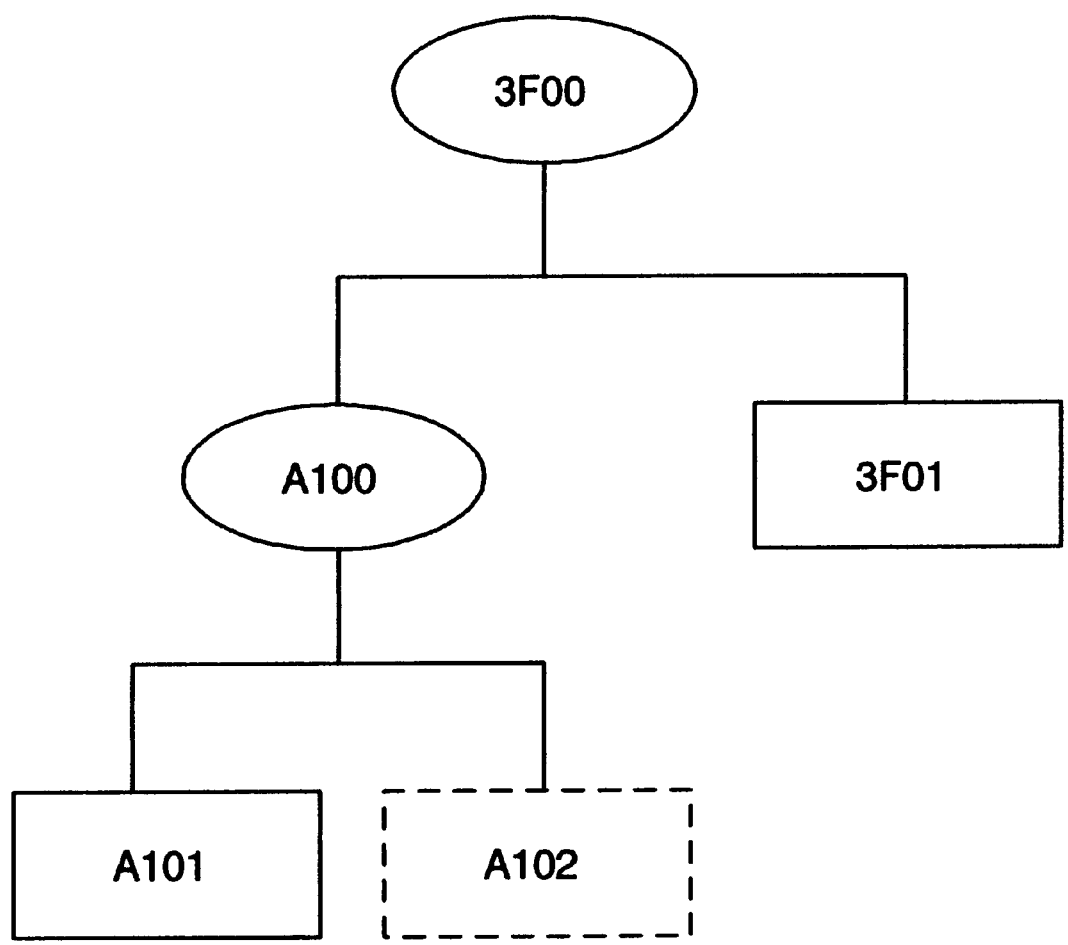
FIG. 1 shows a diagrammatic representation of a directory in the memory of a chip card.

According to FIG. 1, the directory in the memory of the chip card has a main directory 3F00. Disposed in this main directory is a registration file 3F01. The main directory also has an application directory A100. Located in the application directory A100 is the binary file A101, which contains data.

The directory with the main directory 3F00, the registration file 3F01, the application directory A100 and the binary file A101 was imported by the manufacturer of the chip card onto the same. This directory structure created by the issuer of the chip card in the memory of the chip card is configured so that an application A100 of an application supplier 1 is executable.

Application A100 is now to be expanded by a new command. For this, the application supplier 1 has generated a command code. The application supplier 1 must have this command code certified by the card issuer. This means that the card issuer confirms that the command code as created by the application supplier 1 can be imported into a defined location in the directory of the chip card.

The command code generated by the application supplier is to be disposed in a binary file A102. According to FIG. 1, the binary file A102 is located in the application directory A100. On importing the command code by the application supplier 1, it must be ensured that the command code-is placed properly in the binary file A102. This is a matter both of avoiding unintentional errors when importing the command code and of preventing deliberate manipulation, if the application supplier 1 is insinuated as having an interest in undermining the security standard of the chip card.

Figure 2:
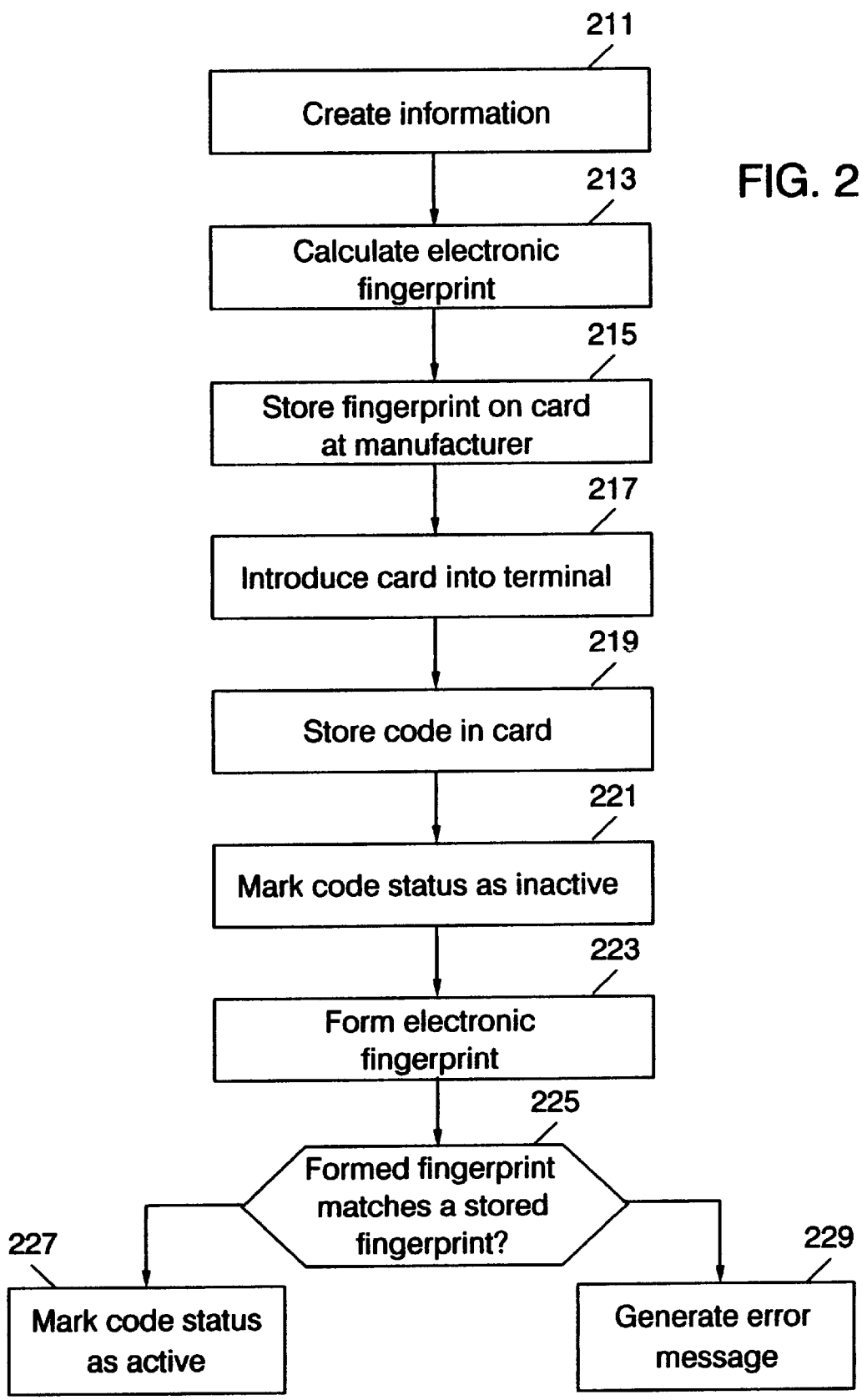
FIG. 2 shows a flow diagram of a method according to the invention.

To guarantee proper importing of the command code into the binary file A102, information is created at block 211 of FIG. 2, in the context of certification by the card issuer which on the one hand comprises the command code and on the other hand contains additional information comprising a path indication for the binary file A102 in the directory of the chip card. An electronic fingerprint, in particular a hash value, of the information is then calculated at block 213. This electronic fingerprint of the information is filed at block 215 by the card issuer in the registration file 3F01.

At any later point in time, the card holder can now integrate the new command into application A101. In doing this it may be necessary to recreate the binary file A102 when importing the command code. However, overwriting of the old code in the binary file A102 with the new command code can also be executed. It is also conceivable that a new directory with at least one file has to be created when importing a new code.

To import the new command code, the chip card is introduced at block 217, into a terminal of the application supplier 1. The card holder then selects a function of the terminal by means of which the command code is transferred at block 219, to the chip card. After the command code has been written to the binary file A102, the binary file A102 is marked at block 221, as inactive. This takes place by way of the status of the binary file being adapted accordingly. The status of a file can be stored for example in a byte within a file header.

To be able to use the command code in the context of application A101, it must be now be verified whether the command code has been integrated properly into the chip card. If this is the case, the status of the binary file A102 is then changed such that it indicates that the file A102 is active.

To verify that a command code has been imported properly, an electronic fingerprint is formed on the chip card at block 223, of information which comprises the command code transferred to the chip card and a path indication for the binary file A102. The information is created by appending the path indication to the command code. The path indication can be formed for example by lining the three indications 3F00/A1OO/A102 up next to one another. Alternatively, the path indication can also begin with a name defined according to ISO 7816-5. This is possible as the name of an application must be unambiguous according to ISO 7816-5. If the command code has been imported properly onto the chip card, the information formed on the chip card is identical to the information generated by the card issuer when certifying the command code of the application supplier 1.

The electronic fingerprint calculated on the chip card is now compared at block 225, with the fingerprint deposited by the card issuer in the registration file 3F01. If several electronic fingerprints of various application suppliers are filed in the registration file 3F01, then the electronic fingerprint calculated on the card is compared successively with the other electronic fingerprints in the registration file 3F01 until it is established whether the electronic fingerprint calculated on the card matches one of the other fingerprints or it is established that no match has been found. If a match with one of the other electronic fingerprints is established, the command code in the binary file A102 is activated at block 227, i.e. it is usable in the context of the application A100. If no match is established, the binary file A102 is not activated and an error message is generated at block 229.

As well as the path indication of the binary file A102, other attributes of the binary file A102, the application directory A100 and/or the directory in the memory of the chip card can be included when calculating the electronic fingerprint of the information on certification by the card issuer and when calculating the electronic fingerprint on the chip card. Thus for example information regarding the size and type of the binary file A102 can be included when calculating the electronic fingerprint at blocks 213 and 223.

In order to ensure that the command code imported into the binary file A102 has been imported into a complete file structure of the application directory A100, the following parameters for each file in the application directory A100 can be taken up when calculating the electronic fingerprint:

file identification,
  size of the file,
    access rights to the file as per CEN 726, which is specifically incorporated by reference herein.

Furthermore, on generating the information for which an electronic fingerprint is then calculated, features and attributes of the application directory A100 itself can be integrated.

Care should always be taken to ensure that the parameters of the files and/or the application directory are arranged in the same order on generation of the information by the card issuer for certification and on generation of the information on the chip card respectively. Only thus can it be guaranteed that the respective electronic fingerprints are comparable with one another.

If the chip card to which the new command code is to be transferred has a processor which supports asymmetrical cryptography, then the calculation of an electronic signature can be used when verifying the proper importing of the command code. In this development of the method, the card issuer transfers an electronic signature to the registration file 3F01 in the context of certification instead of the electronic fingerprint, this electronic signature being formed with the aid of a secret key from the electronic fingerprint of the information. In this embodiment also the information comprises the command code and a path indication for and/or other information regarding the binary file A102.

When verifying that the command code has been imported properly into the binary file A102 on the chip card, a public key is used to decode the electronic signature transferred by the card issuer to the registration file 3F01. The result of decoding by means of the public key is an electronic fingerprint. This electronic fingerprint is then compared with the electronic fingerprint ascertained on the chip card. Depending on whether a match is established or not, the command code transferred to the chip card is then activated or not.

Even when using asymmetrical cryptography, parameters of the files of the application directory or of the application directory itself can be included when generating the information from which the electronic fingerprint and electronic signature are then calculated.

A command by means of which verification of the proper importing of the command code into the binary file A102 and the activation of the command code on establishing proper importing are executed, can be structured in accordance with ISO 7816-4 and has the following parameters in particular:

coding of the command
  file identification for the file to which the command is applied,
    key identification for the cryptographic key to be used, if asymmetrical cryptography is used and
    length of the following data and/or the following code.

These parameters are disposed in a command header. The code transferred to the chip card is verified and then activated by means of a command comprising the parameters described.

In addition to the supplementing or expansion of an application directory A100 described, it is also possible with the aid of the method described to generate new application directories in their totality and verify their proper importing into the memory of the chip card. To generate application directories and the files contained therein, standard commands, for example according to CEN 726, are used.

During the course of importing a new application directory, this new application directory is marked as a temporary application directory, which may not yet be used.

If an interruption should occur when creating an appropriate application directory and its files, in particular due to a power failure or removal of the chip card from the terminal, then the directory ranking above the application directory to be created is selected automatically when the chip card is next inserted into a terminal and the reset executed in this regard. In FIG. 1, the directory 3F00 is the directory ranking above the application directory A100. Automatic selection of the higher-ranking directory prevents the incompletely generated application directory, which is still marked as a temporary application directory, from being accessed. With the aid of the "temporary" marking incompletely generated application directories can be deleted in the context of the reset of the chip card when it is reinserted into a terminal if a search for application directories marked as "temporary" is carried out.

Importing of the new application directory can be executed for example using a command which basically corresponds to the CREATE command from standard CEN 728. The CREATE command is expanded by the following attributes:

Only application directories which have a name can be created.
  The new application directory is marked during its creation as "temporary".
  Once creation is completed, the new application directory is selected automatically.

If the creation of an application directory with its files, for example the application directory A100 with the files A101 and A102, has been completed successfully, it can then be verified with the aid of the method described, in which an electronic fingerprint and/or an electronic signature is calculated, whether the application directory and its files have been properly imported onto the chip card. To do this, information for example regarding the number of files contained in the application directory and their structural distribution is included in calculation of the electronic fingerprint or the electronic signature according to the method described.

A command for carrying out verification of the importing of the application directory can in turn be structured advantageously according to ISO 7816-4.

While the invention has been particularly shown and described with reference to a preferred embodiment and process, it will be understood that various changes in form and detail may be made therein without departing from the spirit and scope of the invention. On the contrary, the invention is intended to cover all alternatives, modifications and equivalents as may be included within the spirit and scope of the invention as described by the appended claims.

What is claimed is:

1. Method of importing information, in particular application information, onto a chip card which has a memory with a directory, the method comprising the following method steps:

create an electronic fingerprint of code and path information;

store the electronic fingerprint of code and Data information and a plurality of electronic fingerprints on a registration file in the directory of the chip card at the chip card manufacturer;

receive the chip card into a terminal for adding application information;

receive application code and path information from an application provider and store the application code in a file in the directory specified by the path information.

mark status of the received code to inactive;

form on the chip card, an electronic fingerprint of the received application code and received path information;

compare the electronic fingerprint formed on the chip card with the plurality of electronic fingerprints stored on the chip card;

mark status of the received application code to active if one of the electronic fingerprints stored on the chip card matches the electronic fingerprint formed on the chip card;

generate an error message if none of the electronic fingerprints stored on the chip card matches the electronic fingerprint formed on the chip card.

2. Method of importing application information, onto a chip card which has a memory with a directory, the method comprising the steps of:

receiving the chip card into a terminal for adding application information;

receiving application code and path information from an application provider and storing the application code in a file in the directory specified by the path information.

marking status of the received code to inactive;

forming on the chip card, an electronic fingerprint of the received application code and received path information;

comparing the electronic fingerprint formed on the chip card with a plurality of electronic fingerprints in a registration file in the directory of the chip card which were stored on the chip card at the chip card manufacturer;

marking status of the received application code to active if one of the electronic fingerprints stored on the chip card matches the electronic fingerprint formed on the chip card;

generating an error message if none of the electronic fingerprints stored on the chip card matches the electronic fingerprint formed on the chip card.

* * * * *

UNITED STATES PATENT AND TRADEMARK OFFICE
CERTIFICATE OF CORRECTION

PATENT NO. : 6,173,401 B1
DATED : January 9, 2001
INVENTOR(S) : Michael Deindl, et al.

It is certified that error appears in the above-identified patent and that said Letters Patent is hereby corrected as shown below:

In column 2, line 41, delete the numerial "10" and replace with the numerial --2--.

In column 7, line 27 following the word information, please delete the"." and replace with a -- ; --.

In column 8, line 15 following the word information, please delete the "." and replace with a --;--.

Signed and Sealed this

Twenty-ninth Day of May, 2001

NICHOLAS P. GODICI

*Attest:*

*Attesting Officer*   *Acting Director of the United States Patent and Trademark Office*